US012802855B2

(12) United States Patent
Wang et al.

(10) Patent No.: US 12,802,855 B2
(45) Date of Patent: Nov. 17, 2026

(54) ROTARY CONTROL ASSEMBLY, AND AN ELECTRONIC PRODUCT

(71) Applicants: HONGFUJIN PRECISION ELECTRONS (YANTAI) CO., LTD., Yantai (CN); HON HAI PRECISION INDUSTRY CO., LTD., New Taipei (TW)

(72) Inventors: Liang-I Wang, New Taipei (TW); Yao-Che Peng, New Taipei (TW); Yu-Hsiang Hao, New Taipei (TW); Chien-Heng Chen, New Taipei (TW)

(73) Assignees: HONGFUJIN PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 142 days.

(21) Appl. No.: 18/809,620

(22) Filed: Aug. 20, 2024

(65) Prior Publication Data

US 2025/0391595 A1 Dec. 25, 2025

(30) Foreign Application Priority Data

Jun. 21, 2024 (CN) ......................... 202410812389.3

(51) Int. Cl.
*H01F 7/08* (2006.01)
*H01F 7/06* (2006.01)
*H01F 7/126* (2006.01)

(52) U.S. Cl.
CPC ............. *H01F 7/081* (2013.01); *H01F 7/064* (2013.01); *H01F 7/126* (2013.01)

(58) Field of Classification Search
CPC .......... H01F 7/081; H01F 7/064; H01F 7/126; G01D 5/145
USPC .......................................................... 361/139
See application file for complete search history.

(56) References Cited

U.S. PATENT DOCUMENTS

| | | | | |
|---|---|---|---|---|
| 8,968,538 | B2 * | 3/2015 | Kitada | H01J 37/3414 204/298.18 |
| 10,823,586 | B2 * | 11/2020 | Eagen | G01D 5/245 |
| 2004/0085063 | A1 * | 5/2004 | Jin | G01D 5/202 324/207.16 |
| 2017/0343382 | A1 * | 11/2017 | Fukumura | H02K 11/215 |
| 2018/0013334 | A1 * | 1/2018 | Ishikura | H02K 11/215 |

(Continued)

*Primary Examiner* — Dharti H Patel
(74) *Attorney, Agent, or Firm* — ScienBiziP, P.C.

(57) ABSTRACT

This application provides a rotary control assembly and an electronic product, the rotary control assembly comprises a substrate plate, a rotating member rotationally connected to the substrate plate, a magnetic member arranged on the rotating member, a magnetic signal detection member, and a control assembly arranged on the substrate plate or the rotating member; a magnetic field generated by the magnetic member changes with a rotation of the rotating member; the magnetic signal detection member is arranged on the substrate plate, and located in the magnetic field, and detects magnetic field changes of the magnetic member. The control assembly receives a magnetic field change signal detected by the magnetic signal detection member, and the magnetic field change signal is processed as a control signal. The control assembly further transmits the control signal to the electronic body to control the electronic body to execute a corresponding instruction.

16 Claims, 7 Drawing Sheets

(56) References Cited

U.S. PATENT DOCUMENTS

| | | | | |
|---|---|---|---|---|
| 2018/0080797 | A1* | 3/2018 | Roos | G01D 18/001 |
| 2019/0003856 | A1* | 1/2019 | Kawakami | H02P 6/16 |
| 2020/0116470 | A1* | 4/2020 | Yamamoto | G01B 7/30 |
| 2020/0280245 | A1* | 9/2020 | Osada | G01D 5/145 |
| 2020/0400463 | A1* | 12/2020 | Sogo | G01D 5/16 |
| 2021/0023697 | A1* | 1/2021 | Watanabe | G01D 5/145 |
| 2024/0175670 | A1* | 5/2024 | Saito | G01D 5/145 |
| 2024/0344852 | A1* | 10/2024 | Tanaka | G01D 5/145 |
| 2024/0418546 | A1* | 12/2024 | Sadakane | G01D 5/3473 |
| 2025/0060424 | A1* | 2/2025 | Egawa | G01R 33/0047 |

* cited by examiner

ROTARY CONTROL ASSEMBLY, AND AN ELECTRONIC PRODUCT

FIELD

The present disclosure relates to field of electronic product technology, and in particular to a rotary control assembly, and an electronic product.

BACKGROUND

Electronic products usually include a control assembly and a product body. Consumers operate the control assembly to make the product body execute corresponding instructions. At present, in most existing electronic products, the control assembly and the product body are installed in one, resulting in a large volume of the electronic product, which can not meet needs of consumers for a miniaturization of electronic products.

Thus, there is room for improvement within the art.

BRIEF DESCRIPTION OF THE DRAWINGS

Many aspects of the disclosure can be better understood with reference to the following drawings. The members in the drawings are not necessarily drawn to scale, the emphasis instead being placed upon clearly illustrating the principles of the disclosure. Moreover, in the drawings, like reference numerals designate corresponding members throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening members, and is not necessarily limited to physical connections. The connection may be such that the objects are permanently coupled or releasably coupled. The term "substantially" is defined to be essentially conforming to the particular dimension, shape, or other feature that the term modifies, such that the member need not have that exact feature. The term "comprising," when utilized, means "including, but not necessarily limited to"; it in one embodiment indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein includes any and all combinations of one or more of associated listed items.

Figure 1:
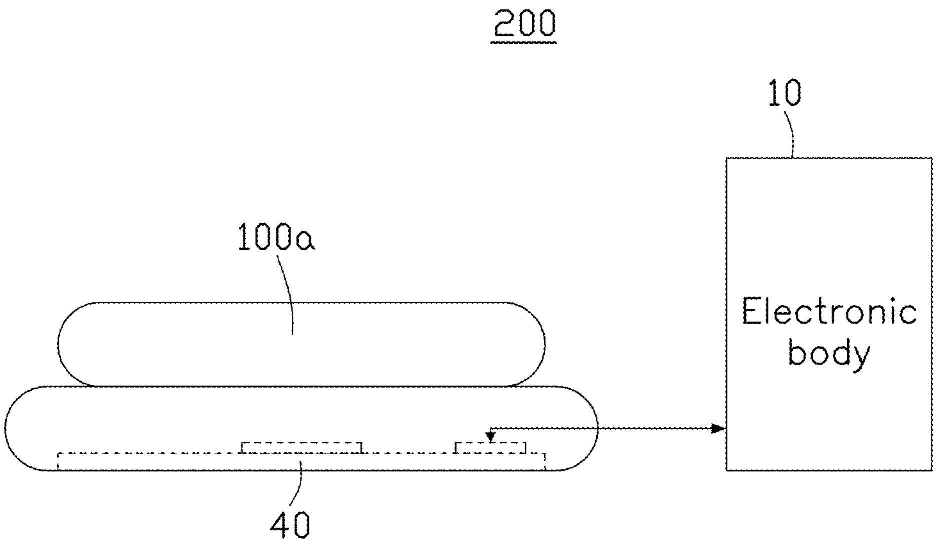
FIG. 1 shows a structure diagram of an electronic product of the present application in an embodiment.

Referring to FIG. 1, in a first embodiment, the electronic product 200 can be applied in various electronic fields such as entertainment and exercise. The electronic product 200 includes an electronic body 10 and a rotary control assembly 100*a*. The rotary control assembly 100*a* is separate from the electronic body 10, and the rotary control assembly 100*a* can be communicated with the electronic body 10 by wireless connection method or wire connection method. The rotary control assembly 100*a* includes a control assembly 40, the control assembly 40 is in signal connection with the electronic body 10.

The rotary control assembly 100*a* is applied as an executive structure of the electronic product 200, users can operate the rotary control assembly 100*a* to perform rotations and other actions by applying an external force to the rotary control assembly 100*a*. The rotary control assembly 100*a* can record its own rotation angle and other attitude changes, and then transfer the attitude changes to the control assembly 40. The control assembly 40 processes the attitude changes, and then generates one or more control signals, the control assembly 40 transmits one or more control signals to the electronic body 10, and the electronic body 10 executes one or more corresponding instructions of the control signals.

Referring to FIG. 1 to FIG. 4, in the first embodiment, the rotary control assembly 100*a* is configured for information exchanges with the electronic body 10. The rotary control assembly 100*a* includes a substrate plate 20, a rotating member 30, a magnetic member 50, a magnetic signal detection member 60, and a control assembly 40.

The rotating member 30 is rotationally connected to one side of the substrate plate 20, the users can drive the rotating member 30 to rotate to generates the attitude changes. The magnetic member 50 is arranged on the rotating member 30 and generates a magnetic field. When the rotating member 30 rotates, the magnetic field generated by the magnetic part 50 changes. The magnetic signal detection member 60 is provided on the substrate plate 20. The magnetic signal detection member 60 is provided in the magnetic field and configured to detect magnetic field changes of the magnetic member 50.

The control assembly 40 is arranged on the substrate plate 20 or the rotating member 30. The control assembly 40 is in signal connection with the magnetic signal detection member 60 and the electronic body 10. The control assembly 40 is configured to receive a magnetic field change signal detected by the magnetic signal detection member 60, and the magnetic field change signal is processed as a control signal. The control assembly 40 is further configured to transmit the control signal to the electronic body 10 to control the electronic body 10 to execute a corresponding instruction of the control signal. Thus, the rotary control assembly 100*a* and the electronic body 10 are set up independently in this application, so that the rotary control assembly 100*a* and the electronic body 10 can be used, stored and transported separately, avoiding a large size of the electronic product 200, facilitating a storage and a transportation of the electronic product 200. In addition, the magnetic member 50 is installed on the rotating member 30, and the magnetic signal detection member 60 is installed on the substrate plate 20. When the rotating member 30 is rotated relative to the substrate plate 20, the magnetic member 50 is further rotated relative to the magnetic signal detection member 60, so that the magnetic field changes of the magnetic member 50 is detected by the magnetic signal detection member 60. The control assembly 40 is directly installed on the substrate plate 20 or the rotating member 30, so that the rotary control assembly 100*a* can not only collect signals, but also directly process collected signals, so as to directly send control signals to the electronic body 10 to control the electronic body 10 to directly execute corresponding instructions, thereby avoiding a transfer station between the rotary control assembly 100*a* and the electronic body 10 to realize a processing of the collected signals and transmissions of the control signals, and making the rotary control assembly 100*a* can be paired with different electronic bodies 10 to improve a scope of application of the rotary control assembly 100*a*.

Referring to FIG. 2 to FIG. 5, in the first embodiment, the substrate plate 20 is a round plate or a square plate. The substrate plate 20 is provided with a mounting cavity 22, the control assembly 40 is received in the mounting cavity 22.

The substrate plate 20 is provided with a mounting port 23, the mounting port 23 is located on one side of the substrate plate 20 away from the rotating member 30. The mounting port 23 is communicated to the mounting cavity 22, so that the control assembly and other components in the mounting cavity 22 can be removed and placed through the mounting port 23. The rotary control assembly 100*a* further includes a mounting cover 90, the mounting cover 90 is detachably connected to the substrate plate 20 by fasteners such as bolts. The mounting port 23 is sealed by the mounting cover 90.

Furthermore, the control assembly 40 includes a circuit board 41, a control component 42, and a signal transfer component 43.

The circuit board 41 can be fixed on an inner wall of the mounting cavity 22 by gluing or connecting with bolts and screws. The control component 42 and the signal transfer component 43 are installed on the circuit board 41. The control component 42 and the signal transfer component 43 are electrically connected with the circuit board 41 through wires, so as to achieve signal transmissions between the control component 42 and the signal transfer component 43. The magnetic signal detection member 60 is connected to the circuit board 41, so that the magnetic signal detection member 60 and the control component 42 are electrically connected through a wire, and the signal transmissions between the control component 42 and the magnetic signal detection member 60 are further achieved.

The signal transfer component 43 is in signal connection with the electronic body 10 through wireless connection technology such as Bluetooth technology. When the magnetic signal detection member 60 detects magnetic field change signals, the magnetic signal detection member 60 transmits the magnetic field change signals to the control component 42, the control component 42 processes the magnetic field change signals to obtain control signals, and the control component 42 then transmits the control signals to the electronic body 10 through the signal transfer component 43, thereby directly controlling the electronic body 10 to execute corresponding instructions.

The magnetic signal detection member 60 can be a hall sensor. Detections of the magnetic field changes by the hall sensor and processes of the magnetic field change signals by the control component 42 are commonly used means in prior art, and technicians in this field can make corresponding designs according to practical applications. In an embodiment of the present application, the magnetic field can be decomposed according to three perpendicular X axes, Y axes and Z axes in the three-dimensional cartesian coordinate system. The magnetic signal detection member 60 detects the component changes of the magnetic field on the X and Y axes. The control component 42 calculates the attitude changes of the rotation angle and rotation direction of the rotating member 30 according to the component changes detected by the magnetic signal detection member 60. A direction of the Z axis is parallel to a direction of an axis of the rotating member 30. The control component 42 presets control signals corresponding to each attitude change of the rotating member 30, and the control component 42 obtains corresponding control signals according to calculated attitude changes and transmits the control signals to the electronic body 10 through the signal transfer component 43.

Furthermore, instructions executed by the electronic body 10 can be action instructions or display instructions. When the instructions executed by the electronic body are action instructions, the electronic body 10 is used as an entertainment product. An electronic screen of the electronic body 10 shows a role that can perform different actions, and users control the role to perform corresponding actions by rotating the rotating member 30. When the instructions executed by the electronic body 10 are display instructions, the electronic body 10 is used as a health product. When users control the rotating member 30 to rotate, the control component 42 calculates data of amount of measurements such as calories consumed by users in the process of controlling the rotating member 30 according to the rotation angle and other data of the rotating member 30. Then, the control component 42 controls the electronic body 10 to display a corresponding calorie value.

In other embodiments, the mounting cavity 22 can be provided in the rotating member 30, thereby installing the control assembly 40 in the rotating member 30. The control assembly 40 in the rotating member 30 can be remotely connected with the magnetic signal detection member 60 arranged on the substrate plate 20 through Bluetooth and other means.

In other embodiments, the control component 42 have at least two modes, such as entertainment mode and health management mode. The control component 42 set corresponding algorithm modules based on each mode of the entertainment mode and the health management mode. When the rotary control assembly 100*a* is applied with the electronic body 10 for entertainment use, users can choose the entertainment mode of the rotary control assembly 100*a*. When users control the rotating member 30 to rotate, the control component 42 can issue corresponding action commands. When the rotary control assembly 100*a* is applied with the electronic body 10 for health management, users can choose the health management mode of the rotary control assembly 100*a*, so that when users control the rotating member 30 to rotate, the control component 42 can issue corresponding display commands.

Thus, the rotary control assembly 100*a* can preset multiple modes in the control component 42, and preset algorithm modules corresponding to each mode of the multiple modes. The algorithm modules can directly calculate command signals in the corresponding mode according to the attitude changes of the rotating member 30, so that the rotary control assembly 100*a* can work based on different use scenarios, thereby improving an applicability of the rotary control assembly 100*a*, and the rotary control assembly 100*a* can be used with different types of products.

Figure 2:
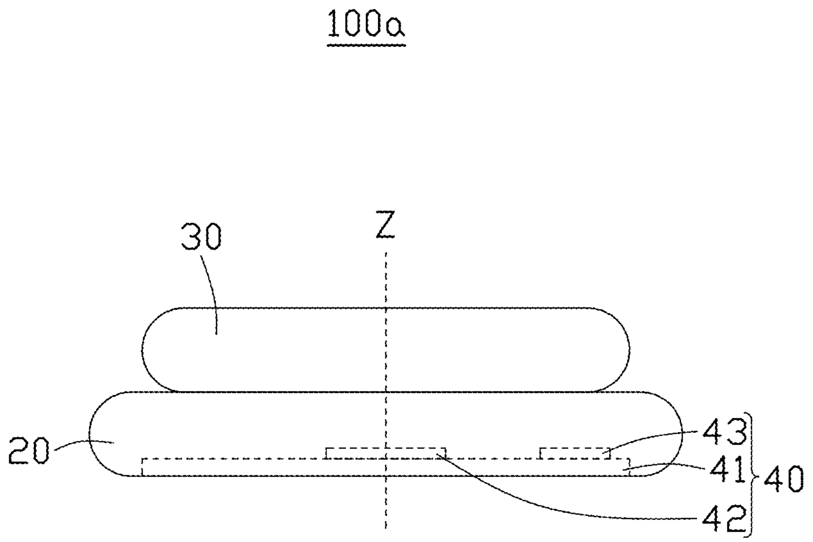
FIG. 2 shows a structure diagram of a rotary control assembly of the present application in a first embodiment.
Figure 3:
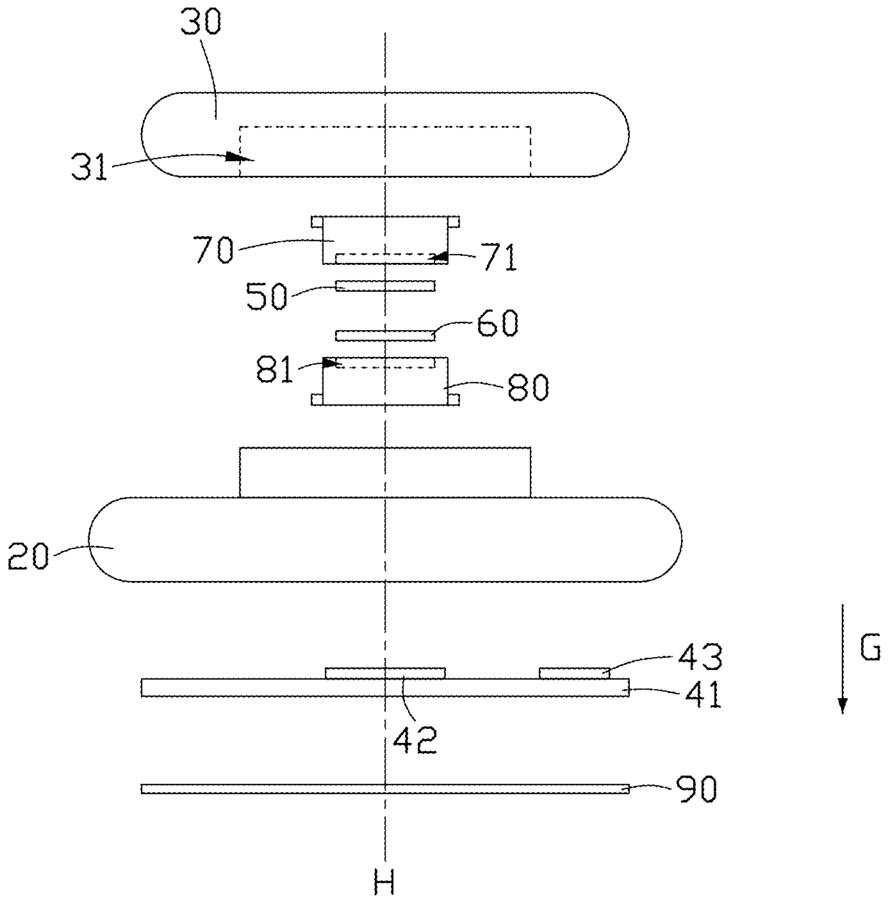
FIG. 3 shows an explosion diagram of the rotary control assembly of the present application in the first embodiment.
Figure 4:
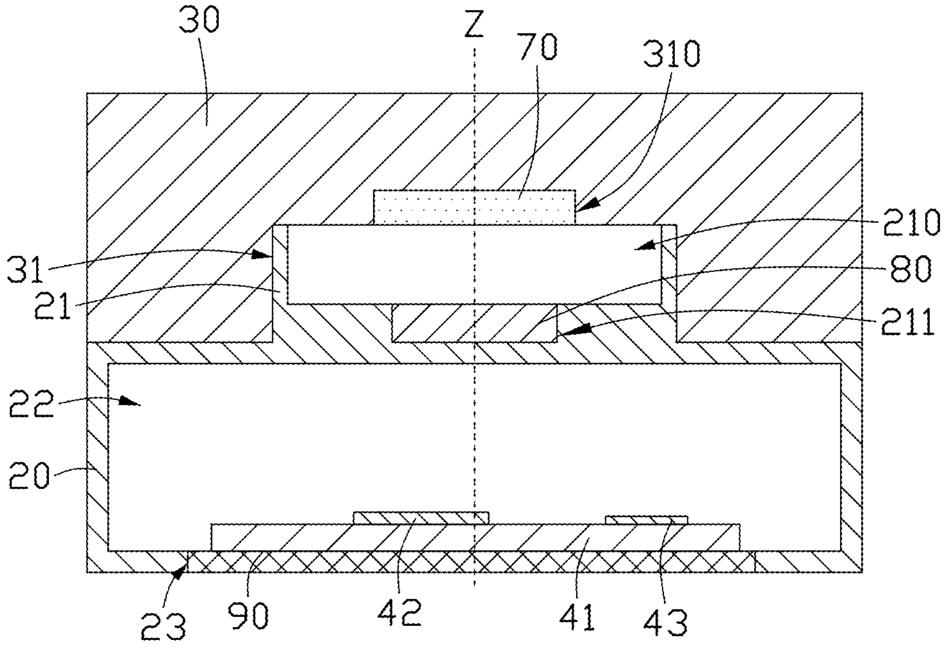
FIG. 4 shows a cross-section diagram of the rotary control assembly of a present application in the first embodiment.
Figure 5:
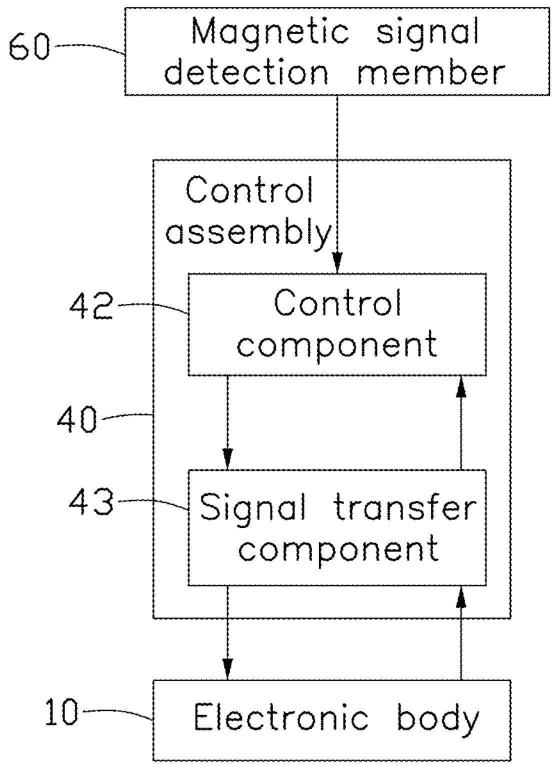
FIG. 5 shows a schematic diagram of signal transmissions of the rotary control assembly of the present application in the first embodiment.

Referring to FIG. 2 to FIG. 4, in one embodiment, along a direction of gravity G, the rotating member 30 is rotationally connected to a top surface of the substrate plate 20. The rotating member 30 can be round plate, square plate, column, etc., and a specific shape of the substrate plate 20 can be selected according to actual design needs. A shape of the magnetic member 50 is circular. A first axis H of the magnetic member 50 is parallel to a second axis Z of the rotating member 30. The magnetic member 50 includes an N pole part and an S pole part, shapes of the N pole part and the S pole part are half rings, so as to form a circular magnetic member 50 by the N pole part and the S pole part.

In one embodiment, the rotating member 30 can be used as a knob, and users can rotate the rotating member 30 by hand.

In other embodiments, the rotating member 30 can be used as a rotary pedal, and users can drive the rotating part 30 by foot.

Referring to FIG. 2 to FIG. 4, in one embodiment, the rotary control assembly 100*a* further includes a first bracket 70 and a second bracket 80. The first bracket 70 is detachably connected to the rotating member 30, the magnetic member 50 is arranged on the first bracket 70. The second bracket 80 is detachably connected to the substrate plate 20, the magnetic signal detection member 60 is arranged on the second bracket 80. In this way, the magnetic member 50 and the magnetic signal detection member 60 can be quickly disassembled by disassembling the first bracket 70 and the second bracket 80, which is convenient to replace the magnetic member 50 and the magnetic signal detection member 60 with appropriate models or sizes according to actual situations.

A first mounting groove 71 is defined on one side of the first bracket 70 near the substrate plate 20, an extension direction of the first mounting groove 71 is parallel to a direction of the rotation axis Z. The magnetic member 50 is received in the first mounting groove 71, and a peripheral surface of the magnetic part 50 abuts against an inner wall of the first mounting groove 71 to limit the magnetic member 50. The magnetic member 50 can be fixed on the first bracket 70 by gluing, etc.

A second mounting groove 81 is arranged on one side of the second bracket 80 near the rotating member 30, an extension direction of the second mounting groove 81 is parallel to the direction of the rotation axis Z. The magnetic signal detecting member 60 is contained in the second mounting groove 81, and a peripheral surface of the magnetic signal detecting member 60 abuts against an inner wall of the second mounting groove 81 to limit the magnetic signal detecting member 60. The magnetic signal detecting member 60 can be fixed on the second bracket 80 by gluing, etc.

Referring to FIG. 2 to FIG. 4, in one embodiment, the rotating member 30 is provided with a rotating groove 31, the rotating groove 31 is located on one side of the rotating member 30 near the substrate plate 20. A shape of the rotating groove 31 is cylindrical, and an extension direction of the rotating groove 31 is parallel to the direction of the rotation axis Z. The substrate plate 20 is provided with a second bulge 21, the second bulge 21 is located on one side of the substrate plate 20 near the rotating member 30. The second bulge 21 can be a cylindrical structure, and the second bulge 21 is adapted to the rotating groove 31. An extension direction of the second bulge 21 is parallel to the direction of the rotation axis Z, and the second bulge 21 is rotationally contained in the rotating groove 31. A rotating bear is arranged between an outer surface of the second bulge 21 and an inner surface of the rotating groove 31.

The rotating member is further provided with a first resisting groove 310, the first resisting groove 310 is arranged on a bottom wall of the rotating groove 31. An extension direction of the first resisting groove 310 is parallel to the direction of the rotation axis Z. The first bracket 70 is held in the first resisting groove 310 to limit the first bracket 70. In addition, bottom walls of the first bracket 70 and the first resisting groove 310 can be provided with connecting holes, and the first bracket 70 is fixed on the bottom wall of the first resisting groove 310 by bolts and other fasteners to avoid the first bracket 70 shaking.

The second bulge 21 is provided with a second receiving groove 210 and a second resisting groove 211. The second receiving groove 210 is defined on one side of the second bulge 21 near the rotating member 30. The second resisting groove 211 is located on a bottom wall of the second receiving groove 210. Extension directions of the second receiving groove 210 and the second resisting groove 211 are parallel to the direction of the rotation axis Z. The second bracket 80 is held in the second resisting groove 211 to limit the second bracket 80. In addition, bottom walls of the second bracket 80 and the second resisting groove 211 can be provided with connecting holes, and the second bracket 80 is fixed on the bottom wall of the second resisting groove 211 through bolts and other fasteners to avoid the second bracket 80 shaking.

Figure 6:
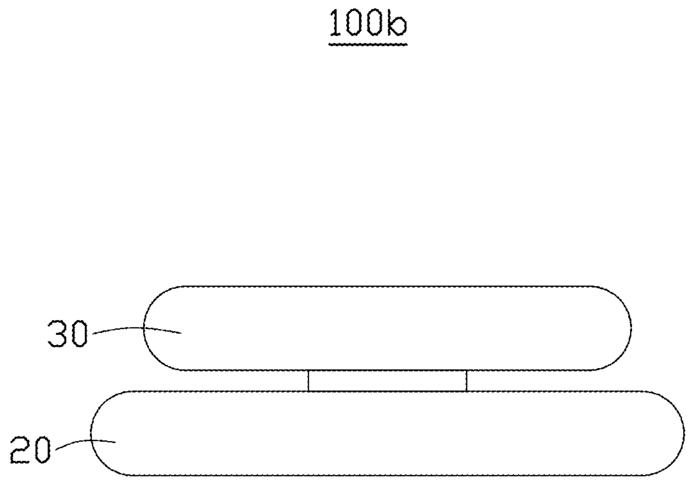
FIG. 6 shows a structure diagram of a rotary control assembly of the present application in a second embodiment.
Figure 7:
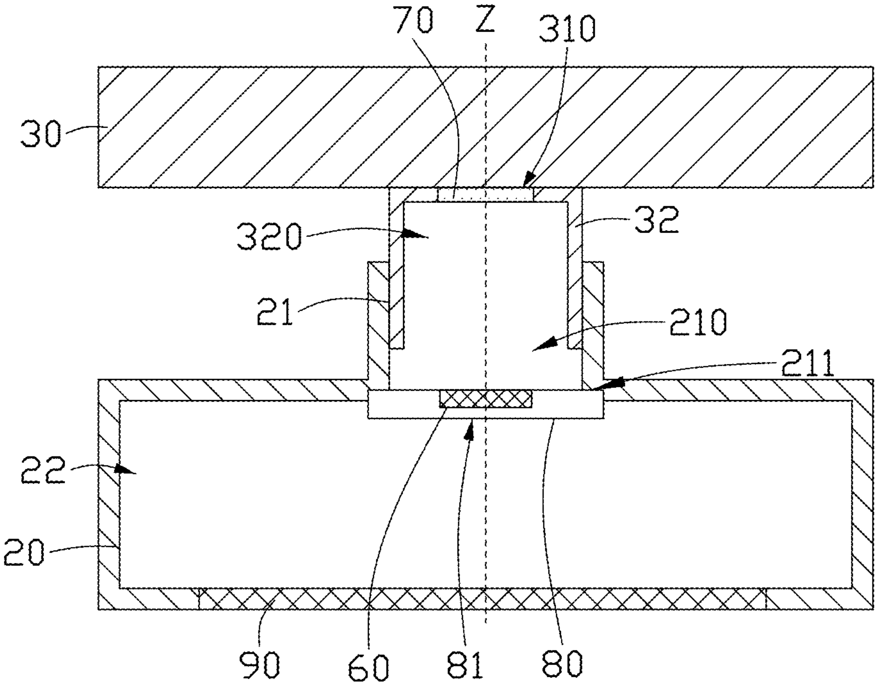
FIG. 7 shows a profile diagram of a rotary control assembly of the present application in the second embodiment.

Referring to FIG. 6 and FIG. 7, in a second embodiment, the rotary control assembly 100*b* includes a substrate plate 20, a rotating member 30, a magnetic member 50, a magnetic signal detection member 60, a first bracket 70, and a second bracket 80.

In the direction of gravity G, the rotating member 30 is rotationally connected to a top surface of the substrate plate 20. The rotating member 30 is provided with a first bulge 32, the first bulge 32 is located on one side of the rotating member 30 near the substrate plate 20. The substrate plate 20 is provided with a second bulge 21, the second bulge 21 is located on one side of the substrate plate 20 near the rotating member 30. The first bulge 32 and the second bulge 21 can be cylindrical structures, and extension directions of the first bulge 32 and the second bulge 21 are parallel to the direction of the rotation axis Z.

The second bulge 21 is provided with a second receiving groove 210. The second receiving groove 210 is located on one side of the second bulge 21 near the rotating member 30, and an extension direction of the second receiving groove 210 is parallel to the direction of the rotation axis Z. The first bulge 32 is rotationally contained in the second receiving groove 210, and a rotating bear is arranged between an outer perimeter of the first bulge 32 and an inner perimeter of the second receiving groove 210.

The first bulge 32 is provided with a first receiving groove 320 and a first resisting groove 310. The first receiving groove 320 is defined on one side of the first bulge 32 near the substrate plate 20, and an extension direction of the first receiving groove 320 is parallel to the direction of the rotation axis Z. The first resisting groove 310 is defined on a bottom wall of the first receiving groove 320, and the first bracket 70 is received in the first resisting groove 310 to limit the first bracket 70.

The mounting cavity 22 is communicated to the second receiving groove 210, and the second bracket 80 is connected to an inner wall of one side of the mounting cavity 22 near the second receiving groove 210. The inner wall of the side of the mounting cavity 22 near the second receiving groove 210 defines a second resisting groove 211, and the second bracket 80 is held in the second resisting groove 211 to limit the second bracket 80. In addition, the second resisting groove 211 is communicated to the second receiving groove 210. An aperture of an opening of the second receiving groove 210 connected to the second resisting groove 211 is greater than an outer diameter of the magnetic signal detection member 60, so that the magnetic signal detection member 60 is at least partially located in the second receiving groove 210, so that the magnetic signal detection member 60 can sense the magnetic field changes of the magnetic member 50.

In addition to above structures, other structures and principles of the second embodiment are the same as those of the first embodiment and will not be repeated.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of members within the principles of the present embodiments to the full extent indicated by the plain meaning of the terms in which the appended claims are expressed.

What is claimed is:

1. A rotary control assembly, configured for information exchanges with an electronic body; and comprising:

a substrate plate;

a rotating member rotationally connected to one side of the substrate plate;

a magnetic member defined on the rotating member, and a magnetic field generated by the magnetic member changes with a rotation of the rotating member;

a magnetic signal detection member defined on the substrate plate, and the magnetic signal detection member is defined in the magnetic field of the magnetic member, and configured to detect magnetic field changes of the magnetic member;

a control assembly, defined on the substrate plate or the rotating member, the control assembly is in signal connection with the magnetic signal detection member and the electronic body, the control assembly is configured to receive a magnetic field change signal detected by the magnetic signal detection member, the magnetic field change signal is generated by a change of the rotation of the magnetic member; the control assembly is further configured to process the magnetic field change signal as a control signal, and transmit the control signal to the electronic body to control the electronic body to execute a corresponding instruction of the control signal;

the rotary control assembly further comprises a first bracket and a second bracket, wherein the first bracket is detachably connected to the rotating member, and the magnetic member is defined on the first bracket; and/or the second bracket is detachably connected to the substrate plate, and the magnetic signal detection member is defined on the second bracket.

2. The rotary control assembly as claimed in claim 1, wherein, a first axis of the magnetic member is parallel to a second axis of the rotating member.

3. The rotary control assembly as claimed in claim 1, wherein, a first mounting groove is arranged on one side of the first bracket near the substrate plate, and the magnetic member is received in the first mounting groove; and/or a second mounting groove is defined on one side of the second bracket near the rotating member, and the magnetic signal detecting member is received in the second mounting groove.

4. The rotary control assembly as claimed in claim 1, wherein, the rotating member is provided with a first bulge defined on one side of the rotating member near the substrate plate; the substrate plate is provided with a second bulge on one side of the substrate plate near the rotating member; the second bulge is provided with a second receiving groove defined on one side of the second bulge near the rotating member, the first bulge is rotationally received in the second receiving groove.

5. The rotary control assembly as claimed in claim 4, wherein, the substrate plate is provided with a mounting cavity, the control assembly is received in the mounting cavity, the mounting cavity communicates with the second receiving groove, the second bracket is connected to an inner wall of the mounting cavity near the second receiving groove, and the magnetic signal detection member is at least partially received in the second receiving groove.

6. The rotary control assembly as claimed in claim 4, wherein, the first bulge is provided with a first receiving groove defined on one side of the first bulge near the substrate plate, and the first bracket is connected with a bottom wall of the first receiving groove.

7. The rotary control assembly as claimed in claim 1, wherein, the rotating member is provided with a rotating groove defined on one side of the rotating member near the substrate plate, the substrate plate is provided with a second bulge, the second bulge is defined on one side of the substrate plate near the rotating member, the second bulge is rotationally received in the rotating groove; the rotating member is provided with a first resisting groove, the first resisting groove is defined on a bottom wall of the rotating groove, the first bracket is received in the first resisting groove; the second bulge is provided with a second receiving groove and a second resisting groove, the second receiving groove is defined on one side of the second bulge near the rotating member, the second resisting groove is arranged on a bottom wall of the second receiving groove, the second bracket is received in the second resisting groove.

8. The rotary control assembly as claimed in claim 1, wherein, the control assembly comprises a circuit board, a control component, and a signal transfer component, the circuit board is located on the substrate plate, the control component and the signal transfer component are located on the circuit board, the control component is in signal connection with the signal transfer component, the magnetic signal detection member, and the electronic body.

9. An electronic product, comprising:

an electronic body, a rotary control assembly, configured for information exchanges with the electronic body; the rotary control assembly comprises a substrate plate, a rotating member, a magnetic member, a magnetic signal detection member, and a control assembly;

the rotating member is rotationally connected to one side of the substrate plate; the magnetic member is defined on the rotating member, and a magnetic field generated by the magnetic member changes with a rotation of the rotating member; the magnetic signal detection member is defined on the substrate plate, and the magnetic signal detection member is defined in the magnetic field of the magnetic member, and is configured to detect magnetic field changes of the magnetic member; the control assembly is defined on the substrate plate or the rotating member, the control assembly is in signal connection with the magnetic signal detection member and the electronic body, the control assembly is configured to receive a magnetic field change signal detected by the magnetic signal detection member, the magnetic field change signal is generated by a change of the rotation of the magnetic member; the control assembly is further configured to process the magnetic field change signal as a control signal, and transmit the control signal to the electronic body to control the electronic body to execute a corresponding instruction of the control signal;

the rotary control assembly further comprises a first bracket and a second bracket, wherein the first bracket is detachably connected to the rotating member, and the magnetic member is defined on the first bracket; and/or the second bracket is detachably connected to the substrate plate, and the magnetic signal detection member is defined on the second bracket.

10. The electronic product as claimed in claim 9, wherein, a first axis of the magnetic member is parallel to a second axis of the rotating member.

11. The electronic product as claimed in claim 9, wherein, a first mounting groove is arranged on one side of the first bracket near the substrate plate, and the magnetic member is received in the first mounting groove; and/or a second mounting groove is defined on one side of the second bracket near the rotating member, and the magnetic signal detecting member is received in the second mounting groove.

12. The electronic product as claimed in claim 9, wherein, the rotating member is provided with a first bulge defined on one side of the rotating member near the substrate plate; the substrate plate is provided with a second bulge on one side of the substrate plate near the rotating member; the second bulge is provided with a second receiving groove defined on one side of the second bulge near the rotating member, the first bulge is rotationally received in the second receiving groove.

13. The electronic product as claimed in claim 12, wherein, the substrate plate is provided with a mounting cavity, the control assembly is received in the mounting cavity, the mounting cavity communicates with the second receiving groove, the second bracket is connected to an inner wall of the mounting cavity near the second receiving groove, and the magnetic signal detection member is at least partially received in the second receiving groove.

14. The electronic product as claimed in claim 12, wherein, the first bulge is provided with a first receiving groove, the first receiving groove is defined on one side of the first bulge near the substrate plate, and the first bracket is connected with a bottom wall of the first receiving groove.

15. The electronic product as claimed in claim 9, wherein, the rotating member is provided with a rotating groove defined on one side of the rotating member near the substrate plate, the substrate plate is provided with a second bulge, the second bulge is defined on one side of the substrate plate near the rotating member, the second bulge is rotationally received in the rotating groove; the rotating member is provided with a first resisting groove, the first resisting groove is defined on a bottom wall of the rotating groove, the first bracket is received in the first resisting groove; the second bulge is provided with a second receiving groove and a second resisting groove, the second receiving groove is defined on one side of the second bulge near the rotating member, the second resisting groove is arranged on a bottom wall of the second receiving groove, the second bracket is received in the second resisting groove.

16. The electronic product as claimed in claim 9, wherein, the control assembly comprises a circuit board, a control component, and a signal transfer component, the circuit board is located on the substrate plate, the control component and the signal transfer component are located on the circuit board, the control component is in signal connection with the signal transfer component, the magnetic signal detection member, and the electronic body.

* * * * *